Figure 1:
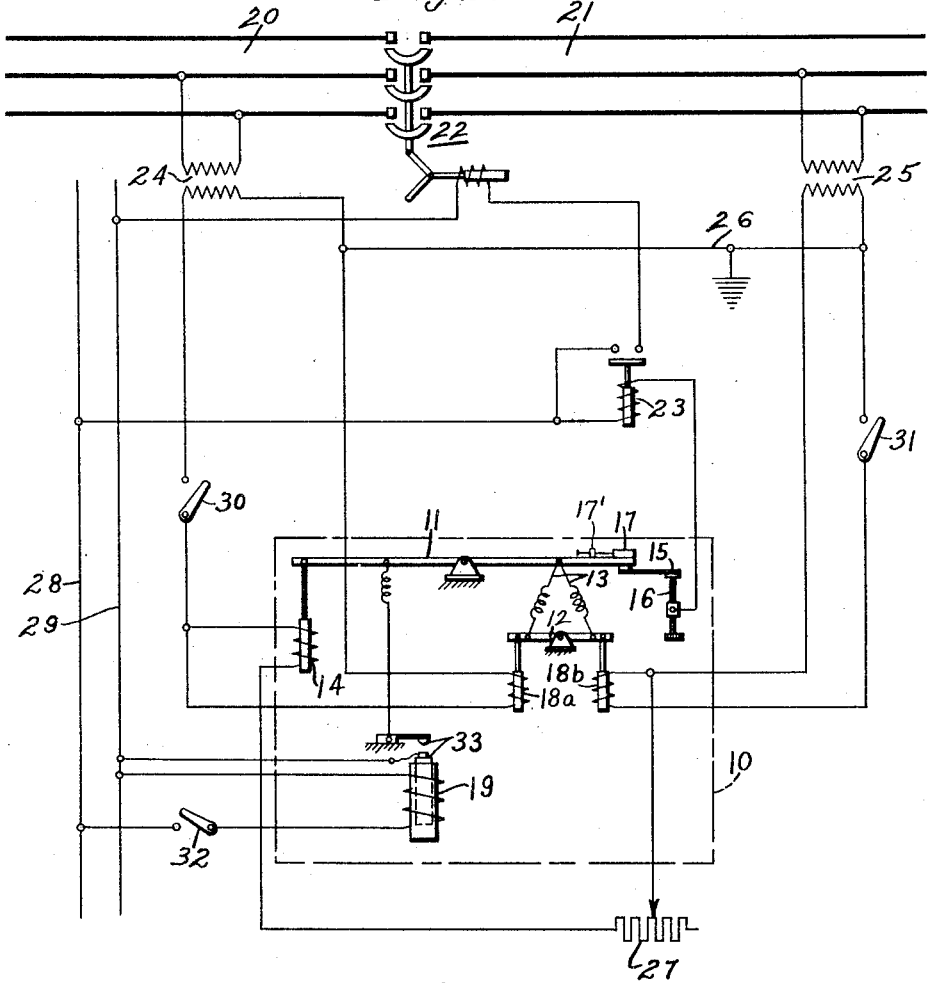

March 31, 1931.    F. H. GULLIKSEN    1,798,669

AUTOMATIC SYNCHRONIZER

Filed Aug. 22, 1928

Degrees OF Advance Closure.

INVENTOR
Finn H. Gulliksen
BY
Wesley G. Carr
ATTORNEY

Patented Mar. 31, 1931

1,798,669

UNITED STATES PATENT OFFICE

FINN H. GULLIKSEN, OF WILKINSBURG, PENNSYLVANIA, ASSIGNOR TO WESTINGHOUSE ELECTRIC & MANUFACTURING COMPANY, A CORPORATION OF PENNSYLVANIA

AUTOMATIC SYNCHRONIZER

Application filed August 22, 1928. Serial No. 301,254.

This invention pertains to devices for automatically connecting two alternating-current circuits in parallel-circuit relation under suitable conditions.

The principal object of my invention is to provide a device of the type described which shall be effective to connect two alternating-current circuits in parallel when the voltages thereof are in phase.

A further object of my invention is the provision of an automatic synchronizer having means for causing the paralleling operation to be effected in advance of the occurrence of phase coincidence of the voltages of the circuits to be paralleled, when said voltages are of different values.

Another object of the system of my invention is to provide an automatic synchronizer in which the advance angle at which the synchronizer operates the tie breaker is proportional to the difference in the voltages of the circuits.

A still further object of this invention is to produce a synchronizer having the characteristics mentioned which shall be inexpensive in construction, easy of adjustment and reliable in operation.

The invention constituting the subject of this specification is similar, in some respects, to that disclosed in a copending joint application of H. C. Nycum and F. H. Gulliksen for "automatic synchronizer" Serial No. 281,552, filed May 29, 1928, and assigned to the assignee of this application. In the aforesaid copending application, an automatic synchronizer is described which is especially adapted for use in paralleling alternating-current sources, such as generators and distribution circuits, the voltages of which have frequencies which may differ materially. The present invention may be considered a modification of that of the copending application and is especially adapted for use in paralleling alternating-current circuits, the voltages of which have relatively small, if any, difference in their frequencies. A synchronizer of this type will be desirable for the paralleling of different portions of a distribution circuit which is supplied with energy from a common source.

In circumstances such as those mentioned above, it may be found necessary to control the paralleling operation in accordance with the difference, if any, existing in the voltages of the two circuits to be paralleled. It is advantageous, in other words, to parallel the circuit in advance of the occurrence of exact phase coincidence of the voltages thereof by an angle of phase difference which varies in proportion to the difference between the voltages of the circuits, and it is the principal object of the present invention to produce an automatic device capable of accomplishing this result.

It is also an object of this invention to produce an automatic synchronizer which may be adjusted so that it will effect the closing of a tie-breaker exactly at phase coincidence or at a point in advance of phase coincidence. An important feature of this invention is the fact that my synchronizer can easily be adjusted over a considerable operating range. By the use of my synchronizer, it is possible to cause paralleling at a fixed angular advance regardless of the variation in the voltage of one of the sources. It is also possible, by a simple adjustment, to change the characteristics of the synchronizer of my invention to adapt it for applications where it is desired that the advance angle increase in proportion to the voltage difference, and the rate of increase in advance angle with a given voltage difference may also be varied by simple adjustments.

It is also necessary to make provision for compensating for differences in the voltages of the circuits to be paralleled because of the fact that, in synchronizers such as that described in the copending application above referred to, any difference in the voltages of the circuits causes a resultant voltage to be applied to the coils of the synchronizer which prevents the closing of the synchronizing contacts even when the two voltages are in phase. It is an object of this invention, therefore, to provide an automatic synchronizer of the type described having means for compensating for differences in the voltages of the circuits to be paralleled such that, when the two voltages are in phase, paralleling will be effected, regardless of the voltage inequality existing between the circuits.

In accordance with my invention, I provide a system of pivoted levers, one of which is actuated by an electromagnet energized by the beat voltage, or, in other words, the resultant of the voltages of the circuits to be paralleled. The other lever is actuated by opposed electromagnets energized respectively by the voltages of the circuits. These levers are connected by a flexible linkage of peculiar design such that any movement of the second lever resulting from an inequality of the voltages of the circuits will effect a movement of the first lever in a predetermined direction. The first lever is utilized to close a synchronizing contact when the voltages of the circuits are in phase. The addition of the second lever, its actuating solenoids and flexible linkage, causes the engagement of the synchronizing contact in advance of the occurrence of actual phase coincidence when the voltages of the circuits are unequal, regardless of which circuit has the higher voltage.

A complete understanding of the synchronizer of the invention may be obtained from a study of the following description and the accompanying drawings, in which—

Figure 2:
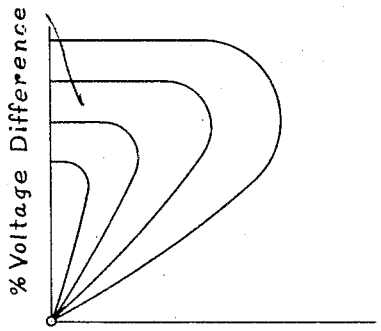

Figure 1 illustrates schematically the circuits and apparatus exemplifying the invention, and Fig. 2 illustrates graphically the operation of the same.

Referring in detail to the drawing, the synchronizer of the invention is indicated within the dotted rectangle 10. The synchronizer comprises a lever 11, pivoted in a suitable bearing, and a second lever 12 likewise pivoted for free angular movement and connected to the lever 11 by a pair of resilient links, such as the springs 13, which extend from the ends of the lever 12 to a common point of the lever 11.

The lever 11 is actuated by a solenoid 14, the armature of which is secured to one end of the lever 11. A synchronizing contact 15 is secured to the other end of the lever 11 and normally engages a suitable fixed contact 16. The lever 11 is normally balanced in the position shown by means of a counterweight 17 which may be adjustable as shown at 17'. When the lever 11 is balanced, the springs 13 are not tensioned but any angular movement of the lever 11 will cause the tensioning of both springs.

The lever 12 is actuated by a pair of opposed solenoids 18a and 18b, the armatures of which are connected to the ends of the lever 12.

The synchronizer of the invention also includes a slow-acting, contact-closing device 19, the function of which will appear hereinafter. The device 19 may comprise, preferably, a magnetic core connected to a plunger adapted to slide in a non-magnetic tube under the influence of a solenoid surrounding the tube. Any other equivalent slow-acting, contact-closing device may, of course, be substituted.

The synchronizer of the invention is intended to effect the paralleling of two alternating-current circuits such as those illustrated at 20 and 21. These circuits may be connected to any suitable sources of alternating current, but, as heretofore indicated, the principal application of the synchronizer of my invention will be the paralleling of adjacent portions of the same distribution circuit. A paralleling switch 22 having a suitable operating coil is provided to connect the circuits 20 and 21. The operating coil of the switch 22 is controlled by a relay 23 which, in turn, is controlled by the synchronizing contact 15 of the synchronizer 10.

Potential transformers 24 and 25 connected respectively to the circuits 20 and 21 supply alternating current to the solenoids 18a and 18b. Corresponding phases of these transformers are connected by the grounded conductor 26, and the resultant of the voltages induced in the secondaries of the transformers is impressed upon the solenoid 14 which is connected in series with a rheostat 27, the function of which will be explained hereinafter.

An auxiliary source of energy, such as the control busses 28 and 29, is provided to supply energy required for operating the switch 22 and the other auxiliary control devices. The control busses may be supplied from a direct-current source or an alternating-current source, such as either of the transformers 24, 25.

The application of energy to the synchronizer may be controlled by the switches 30, 31 and 32. Although these switches are shown as independent manually-operated switches, it is to be understood that, in the preferred embodiment of the invention, these switches are arranged to be manually closed simultaneously or electrically operated and so interlocked that they are all closed simultaneously.

In explaining the operation of the synchronizer of the invention, it will be assumed that the circuits 20 and 21 are connected to different portions of a common distribution circuit, so that the frequency of the voltage of the circuits 20 and 21 will be identical. The absolute value of the voltages, however, may differ because of the magnitude of the loads connected to the circuits and the phase relation of the circuit voltages may differ from exact phase coincidence by reason of the different power factors of the loads connected to the circuits.

The automatic paralleling of the circuits 20 and 21 may be effected by the synchronizer 10 in the following manner. The switches 30, 31 and 32 are simultaneously closed to connect the secondaries of the transformers 24 and 25 to the solenoids 14, 18a and 18b, and to connect the solenoid 19 to the auxiliary current source. The energization of the solenoid 19, after a short time delay, causes the connection of the lever 11 to the bus 29 through the contacts 33 of the device 19.

If the voltages of the circuits 20 and 21 are in phase and equal in magnitude, the resultant of these voltages will be zero and the solenoid 14 will be deenergized. The solenoids 18a and 18b will be energized to the same extent and, consequently, no movement of the lever 12 will result. The contacts 15 and 16 being engaged, a circuit will be completed for the closing coil of the relay 23 from the bus 28 through the winding of said relay, contacts 16 and 15, the lever 11, contacts 33, to the bus 29. The relay 23, upon operating, completes a circuit for the closing coil of the switch 22 which thereupon closes to connect the circuits 20 and 21 in parallel.

If, contrary to the above assumption, the voltages of the circuits 20 and 21 are unequal, it is obvious that the resultant of said voltages, even when they are exactly in phase, will be a voltage of a definite magnitude. This voltage, being applied to the solenoid 14, will tend to maintain the synchronizing contacts 15 and 16 disengaged so that, even though the voltages of the circuits 20 and 21 are in phase coincidence and have the same frequency, paralleling will not be effected, although conditions are appropriate therefor. It is the function of the lever 12 and its actuating solenoids to remedy the disadvantage just described.

The solenoids 18a and 18b being energized respectively by the voltages of the circuits 20 and 21, the lever 12 will assume a position dependent upon the relative magnitudes of the circuit voltages. By means of the resilient links 13, the angular movement of the lever 12, which is proportional to the inequality of the circuit voltages, is transmitted to the lever 11, and regardless of which of the circuits has a higher voltage, the effect of the voltage inequality upon the movement of the lever 11 will be identical. This results from the arrangement of the connections between the levers 11 and 12, which is such that when the lever 12 is in the horizontal position, no torque is exerted on the lever 11, but when the lever 12 assumes a position other than horizontal, regardless of its direction of movement, the torque exerted on the lever 11 tends to cause engagement of the contacts 15 and 16.

It will thus be obvious that the synchronizer of the invention makes provision for compensating for any inequality in the voltages of the circuits to be paralleled so that, when the voltages of the two circuits 20 and 21 are in phase, the two circuits are promptly paralleled, even though the voltages differ in magnitude and a resultant voltage energizes the solenoid 14 to prevent engagement of the contacts 15 and 16.

The function of the slow-acting, contact-closing device 19 is to prevent the energization of the relay 23 coincident with the closure of the switches 30, 31 and 32. By the use of a device similar to that shown at 19, a slight time delay is introduced into the paralleling cycle, so that the synchronizer has a chance to start to function before the paralleling is effected, so that the synchronizing contacts 15 and 16 may be separated if conditions in the circuits 20 and 21 are not suitable for immediate paralleling.

The function of the rheostat 27 is to make possible the adjustment of the effectiveness of the means provided for compensating for voltage inequality. By changing the setting of the rheostat 27, the effect of the compensating coils 18a and 18b may be varied over a wide range. This variation is illustrated in Fig. 2 which is a set of curves showing the relation between the angular advance at which paralleling is effected for various voltage differences with different settings of the rheostat 27.

It will be apparent from the curves shown in Fig. 2 that the advance angle, within which the synchronizer will cause paralleling, increases with increasing voltage difference. At a certain voltage inequality, however, the advance angle decreases rapidly and, above a certain voltage difference, the synchronizer will not operate to cause paralleling. This feature makes it possible to prevent paralleling of two alternating current sources if the voltages thereof differ by more than a predetermined amount.

Another adjustment of the synchronizer of the invention may be effected by moving the contact 16 up or down. This adjustment permits paralleling to be effected at a predetermined angular advance for any voltage difference. For example, if the contact 16 is moved upwardly a given distance, the operation of my synchronizer will be indicated by a curve similar to those shown in Fig. 2, which extends horizontally to the right a corresponding distance.

Although I have illustrated but a single modification of the automatic synchronizer of my invention, I realize that many changes and modifications thereof will occur to those skilled in the art. For this reason, I desire that the scope of my invention be not limited to the particular embodiment thereof herein illustrated and described, except as necessitated by the terms of the appended claims and by the prior art.

I claim as my invention:

1. An automatic synchronizer for a pair of alternating-current circuits that are to be parallel, comprising two pivoted levers, a solenoid and armature for actuating one of said levers, said solenoid being adapted to be energized by the resultant of the voltages of the two alternating-current circuits, a contact carried by said one of said levers to control a switch for connecting said circuits, solenoids and armatures for actuating said other lever, said last-mentioned solenoids being adapted to be energized by the voltages of said circuits, and resilient links connecting the ends of said second lever to a common point on said first lever, whereby any movement of the second lever tends to cause a movement of the first lever.

2. The combination with two alternating-current circuits, a switch for connecting said circuits, and an automatic synchronizer for controlling said switch having two pivoted lever arms, solenoids and armatures for actuating said arms in accordance with the resultant of the voltages of said circuits and the difference thereof, and spring means connecting said levers whereby any movement of one of said levers tends to effect a similar movement of the other.

3. A paralleling system for alternating-current circuits comprising a switch for connecting said alternating-current circuits when the voltages thereof are properly synchronized and a relay for controlling said switch, a pivoted contact-making lever for controlling said relay, a solenoid adapted to be energized by the resultant of the voltages of said circuits for actuating said lever, a second pivoted lever, spring means connecting the ends of said second lever to a common point on said first lever, opposing solenoids adapted to be energized respectively by the voltages of said circuits for actuating said second lever, whereby the first lever is moved toward its contact-making position when the voltages of said circuits are unequal.

4. A device for effecting the connection of alternating-current circuits in parallel when properly synchronized, comprising a pair of pivoted levers, an electromagnet adapted to be energized by the resultant of the voltages of said circuits for actuating one of said levers, a contact carried by said one of said levers adapted to engage a fixed contact, electromagnets adapted to be energized by the voltages of said circuits respectively for actuating the other of said levers, and resilient connections between said levers whereby any movement of said second-mentioned lever tends to cause a movement of the first-mentioned lever in a predetermined direction to effect the engagement of said contacts, and means controlled by said contacts for connecting said circuits in parallel.

5. An automatic synchronizer for two alternating-current circuits that are to be parallel, comprising a system of rocking levers, an electromagnet for actuating one of said levers and a paralleling contact carried thereby for engaging a fixed contact, said electromagnet being adapted to be energized by the resultant of the voltages of the alternating-current circuits, two opposed electromagnets adapted to be energized respectively by the voltages of said circuits for actuating another of said levers, and resilient means connecting said levers, whereby, when the voltages of said circuits differ, said first-mentioned lever is urged toward the position in which said contacts are engaged.

6. An automatic synchronizer for two alternating-current circuits that are to be parallel comprising a plurality of pivoted levers, electromagnets for actuating said levers in accordance with the voltages of the alternating-current circuits and the resultant thereof, a control circuit, a contact on one of said levers for completing said control circuit, and resilient means connecting said levers whereby any movement of one lever effects a movement of the other in a predetermined direction.

7. An automatic synchronizer for alternating-current circuits comprising a system of rocking levers, resilient means for connecting said levers, a solenoid for oscillating one of said levers in response to the beat voltage, solenoids for actuating other levers in response to the difference in the voltages of said circuits, and means controlled by said levers for effecting the connection of said circuits in parallel.

8. In an automatic synchronizer for alternating-current circuits, means responsive to the beat voltage of two alternating-current circuits, means responsive to the difference in the voltages of said circuits, resilient means for connecting the two voltage-responsive means and means controlled by the two voltage-responsive means for effecting the connection of said circuits in parallel.

9. The combination, in an automatic synchronizer for paralleling alternating-current circuits, with a plurality of pivoted members, opposed electromagnets for actuating predetermined pivoted members in response to the voltages of the circuits to be paralleled and an electromagnet responsive to the resultant of the voltages of the alternating-current circuits for operating other predetermined pivoted members, of resilient links for operatively connecting the pivoted members actuated by the opposed electromagnets and the members actuated by the last named electromagnet, and means controlled by said pivoted members for causing said circuits to be connected in parallel.

10. A paralleling system for a pair of alternating-current circuits, comprising a synchronizing switch for effecting the paralleling connection of the circuits, counterbalanced means for closing the switch, means, biased by a force proportional to the departure of the voltages from equality and synchronism, to oppose the closing operation of the switch by the counterbalanced means, means, biased by a force proportional to the difference between the voltages, for closing the switch before the voltages are in phase, and adjusting means for the counterbalanced means for varying the force with which it tends to close the synchronizing switch, whereby the closing of the synchronizing switch to parallel the circuits takes place in advance of the occurrence of the exact phase coincidence of the voltages by an angle of phase difference which varies as the product of the difference between the voltages of the circuits and the adjustment of the adjusting means.

11. A paralleling system for a pair of alternating-current circuits, comprising a synchronizing switch for effecting the paralleling connection of the circuits, a counterbalanced means for closing the switch, means, biased by a force proportional to the departure of the voltages from equality and synchronism, to oppose the closing of the switch by the counterbalanced means, means, biased by a force proportional to the difference between the voltages, for closing the switch before the voltages are in phase, and contact-adjusting means for varying, by a predetermined interval, the time of actuation of the counterbalanced means, whereby the closing of the synchronizing switch to parallel the circuits takes place in advance of the occurrence of exact phase coincidence of the voltages by an angle of phase difference which varies as the sum of the difference between the voltages and the adjustment of the contact-adjusting means.

12. A paralleling system for alternating-current circuits, comprising a synchronizing switch for effecting the paralleling connection of the circuits, counterbalanced means for closing the switch, means, biased by a force proportional to the departure of the voltages from equality and synchronism, to oppose the closing operation of the switch by the counterbalanced means, means, biased by a force proportional to the difference between the voltages, for closing the switch before the voltages are in phase, contact-adjusting means for varying, by a predetermined interval, the time of actuation of the counterbalanced means, and adjusting means for the counterbalanced means for varying the force with which it tends to close the synchronizing switch, whereby the closing of the synchronizing switch to parallel the circuits takes place in advance of the occurrence of exact phase coincidence of the voltages by an angle of phase difference which varies as the sum of the adjustment of the contact adjusting means and the product of the difference between the voltages and the adjustment of the adjusting means.

In testimony whereof, I have hereunto subscribed my name this 20th day of August, 1928.

FINN H. GULLIKSEN.